United States Patent
Brennan, III et al.

(10) Patent No.: US 6,195,484 B1
(45) Date of Patent: Feb. 27, 2001

(54) METHOD AND APPARATUS FOR ARBITRARY SPECTRAL SHAPING OF AN OPTICAL PULSE

(75) Inventors: James F. Brennan, III, Austin; Dwayne L. LaBrake, Cedar Park, both of TX (US); Patrick C. Chou; Hermann A. Haus, both of Cambridge, MA (US)

(73) Assignees: 3M Innovative Properties Company, Saint Paul, MN (US); Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/401,160

(22) Filed: Sep. 22, 1999

Related U.S. Application Data (63) Continuation-in-part of application No. 09/161,944, filed on Sep. 28, 1998, which is a continuation-in-part of application No. 09/110,495, filed on Jul. 6, 1998, now Pat. No. 6,035,083, which is a continuation-in-part of application No. 08/942,590, filed on Oct. 2, 1997, now Pat. No. 5,912,999.

(51) Int. Cl.⁷ .............................. G02B 6/34; H01S 3/00
(52) U.S. Cl. .............................. 385/37; 385/10; 372/25; 372/102; 359/130; 359/572
(58) Field of Search .................... 385/24, 37, 122, 385/10, 4; 359/326, 328, 333, 341, 130, 154, 572, 573, 574, 575; 372/25, 30, 102

(56) References Cited

U.S. PATENT DOCUMENTS

| | | | |
|---|---|---|---|
| 5,104,209 | 4/1992 | Hill et al. | 385/27 |
| 5,499,134 | 3/1996 | Galvanauskas et al. | 359/333 |
| 5,815,307 | * 9/1998 | Arbore et al. | 359/328 |
| 5,862,287 | * 1/1999 | Stock et al. | 385/123 |
| 5,867,304 | * 2/1999 | Galvanauskas et al. | 359/333 |

OTHER PUBLICATIONS

Lawrence R. Chen, et al., Ultrashort Pulse Reflection from Fiber Gratings: A Numerical Investigation, *IEEE*, vol. 15, No. 8, Aug. 1997, pp. 1503–1512.

M. Haner and W. S. Warren, "Synthesis of crafted Optical Pulses by Time doain Modulation in a Fiber–Grating Compressor", *American Institute of Physics*, Appl. Phys. Lett. 52 (18), May 2, 1988, pp. 14581460.

P. Petropoulos et al., "Rectangular pulse generation based on pulse reshaping using a superstructured fiber Bragg grating", Optical Society of America's Technical Digest, Conference Edition, Sep. 23–25, 1999, pp. 186/FC4–188/FC4–3.

W. Drexler et al., "In vivo Ultrahigh–resolution Optical Coherence Tomography", 1999 Optical Society of America's Optics Letters, vol. 24, No. 17, Sep. 1, 1999, pp. 1221–1223.

(List continued on next page.)

*Primary Examiner*—Hemang Sanghavi
(74) *Attorney, Agent, or Firm*—Nestor F. Ho (57) ABSTRACT

A method and an apparatus for stretching an optical pulse and shaping its spectrum. The method includes the step of: providing a an optical fiber element having a first long length fiber Bragg grating having a refractive index perturbation of varying periodicity. The optical pulse is launched into the fiber Bragg grating, wherein the Bragg grating reflects the pulse in a chromatically dispersed output. The reflected output is coupled with an optical modulator programmed to temporally modify the amplitude of the chromatically dispersed output to attenuate selected optical frequencies in a desired pattern. The apparatus for stretching and arbitrarily shaping the spectrum of an optical pulse with a desired wavelength resolution $\Delta\lambda_{res}$ includes a routing optical device and an optical fiber element having a Bragg grating. The routing optical device routes energy between different waveguides, and has an input port to receive the optical pulse.

20 Claims, 8 Drawing Sheets

OTHER PUBLICATIONS

P. Petropoulos et al., "Coherent Control of Short Pulses Using Fibre Bragg Gratings", IEE, 1999 The Institution of Electrical Engineers, pp. 8/1–8/6.

N. G. R. Broderick et al., "High–power chirped–pulse all–fiber amplification system based on large–mode–area fiber gratings", 1999 Optical Society of America's Optics Letters, vol. 24, No. 8, Apr. 15, 1999, pp. 566–568.

L. Boivin et al., "110 Channels × 2.35 Gb/s from a Single Femtosecond Laser", IEEE Photonics Technology Letters, vol. 11, No. 4, Apr. 1999, pp. 466–468.

Miguel A. Muriel et al., "Real–time Fourier transformer based on fiber gratings", 1999 Optical Society of America's Optics Letters, vol. 24, No. 1, Jan. 1, 1999, pp. 1–3.

H. P. Sardesai et al., "A Femtosecond Code–Division Multiple–Access Communication System Test Bed" 1998 IEEE, Journal of Lightwave Technology, vol. 16, No. 11, Nov. 1998, pp. 1953–1964.

H. Geiger et al., "Demonstration of a Simple CDMA Transmitter and Receiver Using Sampled Fibre Gratings", ECOC'98, Sep. 20–24, 1998, Madrid, Spain, pp. 337–338.

M. D. Pelusi et al., "Suppression of Third–Order Fibre Dispersion by Phase Modulation of Stretched Optical Pulses", ECOC'98, Sep. 20–24, 1998, Madrid, Spain, pp. 525–526.

P. C. Chou et al., "Pulse excited interferometric fiber–optic gyroscope", Wednesday Afternoon, , CLEO'98, May 6, 1998, pp. 313–314.

J. L. Corral et al., "True Time–Delay Scheme for Feeding Optically Controlled Phased–Array Antennas Using Chirped–Fiber Gratings", 1997 IEEE Photonics Technology Letters, vol. 9, No. 11, Nov. 1997, pp. 1529–1531.

Y. C. Tong, "Fibre dispersion or pulse spectrum measurement using a sampling oscilloscope", Electronics Letters, May $22^{nd}$, 1997, vol. 33, No. 11, pp. 983–985.

Lawrence R. Chen et al., "Ultrashort pulse propagation in multiple–grating fiber structures", 1997 Optical Society of America's Optics Letters, vol. 22, No. 6, Mar. 15, 1997, pp. 402–404.

M. C. Nuss et al., "Scalable 32 channel chirped–pulse WDM source", Electronics Letters, Jul. $4^{th}$, 1996, vol. 32, No. 14, pp. 1311–1312.

T. Morioka et al., "1Tbit/s (100 Gbit/s×10 channel) OTDM/WDM transmission using a single supercontinuum WDM source", Electronics Letters, May $9^{th}$, 1996, vol. 32, No. 10, pp. 906–907.

A. Boskovic et al., "All–fibre diode pumped, femtosecond chirped pulse amplification system", Electronics Letters, May $25^{th}$, 1995, vol. 31, No. 11, pp. 877–879.

* cited by examiner

– – Modelocked Pulse Spectrum
— Reflected

Fig. 5

– – before filtering
——after filtering

Fig. 6

——— unfiltered
— — notch filter

METHOD AND APPARATUS FOR ARBITRARY SPECTRAL SHAPING OF AN OPTICAL PULSE

RELATED APPLICATIONS

The present application is a continuation-in-part of commonly owned U.S. application Ser. No. 09/161,944, entitled "Long-Length Continuous phase Bragg Reflectors in Optical Media", filed on Sep. 28, 1998, which is a continuation-in-part of U.S. Ser. No. 09/110,495, entitled, "Method for Writing Arbitrary Index Perturbations on a Waveguide", filed Jul. 6, 1998, now U.S. Pat. No. 6,035,683, which is a contination-in-part of Ser. No. 08/942,590, entitled, "Method for Fabrication of In-Line Optical Waveguide Refractive Index Gratings of Any Length", filed Oct. 2, 1997, which has issued as U.S. Pat. No. 5,912,999 on Jun. 15, 1999.

BACKGROUND OF THE INVENTION

The present invention relates to a method and apparatus for stretching and shaping the spectrum of an optical pulse. More specifically, the present invention provides a commercially feasible method and apparatus for arbitrarily shaping the spectrum of an optical pulse by first stretching it with a novel long length fiber Bragg grating and then modifying the amplitude of the stretched pulse temporally.

An optical pulse is a brief burst of radiation in the optical wavelength range. Generally speaking, an unchirped pulse of duration t has a spectral width of ~1/t, e.g. a ~1 nanosecond ($10^{-9}$ second) pulse has a ~1 GHz ($10^9$ Hz) spectral width. The time limit on what constitutes a pulse depends on the application for which the pulse is being sampled or utilized. Various methods may be used to produce optical pulses, such as by Q-switching lasers, mode-locking lasers, or rapidly modulating a light signal. As discussed, a pulse of a given duration has a determinable spectral width, and is thus comprised of radiation from a span of wavelengths. Although a pulse is comprised of many wavelengths of radiation, all these wavelengths will travel simultaneously generally through an optical path, possible exceptions are when the pulse is chirped and thus certain wavelengths lag behind others. The method of the present invention separates these different wavelengths in time so that they can be individually accessed and modified.

In several applications, the spectral properties of optical pulses are exploited to perform useful functions. Broad-spectrum optical sources generated by pulsed radiation are important in many applications. In some optical fiber-based communication systems, the cost of individual distributed feedback laser (DFB) sources may be prohibitive, so sources for spectrally sliced and chirped pulse Wavelength-Division Multiplexer (WDM) communication systems, where signals are sent separately over many wavelength channels, are attractive. WDM communication systems are typically added to preexisting systems when increased capacity is needed but the ability for higher speed data transmission is limited. The spectral properties of optical pulses also are critical to applications where the coherence function of the pulse is of interest, such as Optical Coherence Tomography (OCT) and Interferometric Fiber Optic Gyroscopes (IFOGs).

For some of the applications described above and others, the spectrum of a pulse should be broad, as well as smoothly varying and well controlled. In these applications, spectral shape can be as critical as spectral width. In WDM, OCT, and IFOG applications, the shape of the spectrum directly impacts performance. For WDM, channel equalization requires a flat spectrum; for OCT, image resolution is determined by the signal spectrum; and for IFOG, non-Gaussian spectra cause errors due to coherent Rayleigh backscattering.

Generally the initial spectrum of a pulse must be modified to optimize the performance of a given application, such as WDM, OCT, and IFOG.

Time domain spectral shaping (TDSS) is another technique for spectral shaping, where a pulse is chromatically dispersed temporally and then the amplitude of the stretched pulse is modified. The amplitude of the stretched pulse in the time domain is referred to in the present text as the pulse envelope. To achieve reasonable spectral shaping, the pulse envelope is generally stretched by several times its initial duration. With proper calibration and correction factors, the stretched pulse envelope can be correlated to the frequency spectrum of the pulse. Hence, altering the amplitude of the stretched pulse envelope modifies the frequency spectrum of the pulse. The temporal resolution of the optical modulator and electronics used to modify the stretched envelope limits the available wavelength resolution of the spectral shaping. Standard available electronic equipment has a bandwidth that is generally not greater than ~1 GHz and is thus limited to a ~1 ns temporal resolution.

Pulse stretching has been demonstrated experimentally by using a long length of optical fiber to stretch the pulse temporally. A 20 km length of standard single mode fiber (SMF), with group velocity dispersion of ~15 ps/nm, was used to stretch pulses emitted from a mode-locked laser. As the different wavelengths of light that comprised the pulse propagated through the SMF, they traveled at different group velocities and thus were separated temporally at the output of the fiber. The pulse envelope was stretched from <1 picosecond to ~25 nanoseconds. Because the pulse was chromatically dispersed temporally and the initial pulse envelope was much smaller than the stretched envelope, the stretched pulse envelope was nearly identical to the spectrum shape of the pulse, with proper correction and calibration factors.

In the experiment described above, a photodetector was used to measure the pulse envelope, a reference level was set, and, with an optical amplitude modulator, the spectrum was flattened by forcing all wavelength components to have intensities lower than the reference level. This system was used in a WDM communication system to equalize different channel strengths. This particular implementation of TDSS was limited to flattening spectra and was not used to shape the spectrum arbitrarily. Since this TDSS implementation used a 20 km length of fiber, which is bulky (requires a 4 inch high by 9 inch diameter spool) and displays strong temperature dependent instabilities, this particular technique for stretching pulses is unsuitable for commercial deployment in the previously described applications.

It has been theorized that using a more dispersive element, such as a fiber grating, could increase the amount of pulse stretching and reduce the system size. However, standard chirped Bragg gratings are typically less than 15 centimeters in length, and thus can not provide a meaningful dispersion over a wide bandwidth. Specialized gratings of less than 1.5 m in length have been produced to recompress dispersed light in communication system, but these devices also cannot provide a useful dispersion over a bandwidth wide enough for the above mentioned applications. There are no known instances of an actual application using a fiber Bragg grating to perform time domain spectral shaping of an optical pulse.

Accordingly, the need remains for a commercially viable apparatus and a method for stretching optical pulses and shaping their spectrum.

SUMMARY OF THE INVENTION

The present invention comprises a method and an apparatus for stretching an optical pulse and shaping its spectrum. The method comprises the step of: providing a an optical fiber element having a first long length fiber Bragg grating having a refractive index perturbation of varying periodicity. The optical pulse is launched into the fiber Bragg grating, wherein the Bragg grating reflects the pulse in a chromatically dispersed output. The reflected output is coupled with an optical modulator programmed to temporally modify the amplitude of the chromatically dispersed output to attenuate selected optical frequencies in a desired pattern.

In one embodiment, the step of providing a grating includes providing a grating having a chromatic dispersion capability between ±10 ps/nm and 10 ns/nm. The initial light pulse may have less than 90% of its energy in a 10 MHz spectral range. The step of temporally modifying the amplitude of the chromatically dispersed output may be accomplished using an arbitrary waveform generator having at least 10 MHz bandwidth.

Once stretched and shaped, the chromatically dispersed output may be recompressed. Those skilled in the art will recognize that not only can the output be recompressed, but the same method may be applied to compress any originally chromatically dispersed signal envelope. The step of recompressing the chromatically dispersed output may be accomplished by launching the chromatically dispersed output into a fiber element having a second grating of opposite sign dispersion to that of the first grating. Alternatively, the chromatically dispersed output may be launched into an opposite end of the original optical fiber element.

The method of the present invention further may include the step of launching the chromatically dispersed output into an optical system that relies on nonlinear optical processes.

The present invention further includes a pulse stretching and shaping apparatus for stretching and arbitrarily shaping the spectrum of an optical pulse with a desired wavelength resolution $\Delta\lambda_{res}$. The apparatus includes a routing optical device and an optical fiber element having a Bragg grating. The routing optical device routes energy between different waveguides, and has an input port to receive the optical pulse. In one embodiment, the routing optical device is a non-reciprocal optical device, such as a circulator. In another embodiment, the device may be a connector that couples energy from one waveguide to another.

The optical fiber element has a long-length fiber Bragg grating and is optically coupled to the routing optical device. The Bragg grating has an increasing or decreasing periodicity, wherein $$\Delta\lambda_{res} = (\tau_0 \, W \, C)/2nL,$$

where n is the effective refractive index of the propagating mode in the optical fiber element, c is the speed of light, L is the length of the Bragg grating, W is the reflective bandwidth of the grating and $\tau_0$ is the temporal resolution of the optical modulator system, wherein the optical fiber element reflects a chromatically dispersed output. In one embodiment, the Bragg grating has a chromatic dispersion capability between ±10 ps/nm and 10 ns/mn. And is greater than 20 cms. In length. In other embodiments, the length of the Bragg grating may further exceed two meters.

The apparatus further may include an arbitrary waveform generator that temporally modifies the amplitude of the chromatically dispersed output to attenuate selected optical frequencies.

The apparatus of the present invention may be included in a variety of more complex systems, such as an optical coherence tomography system, an interferometric optical fiber gyroscope, or an optical fiber communication system.

DETAILED DESCRIPTION OF THE INVENTION

Figure 1:
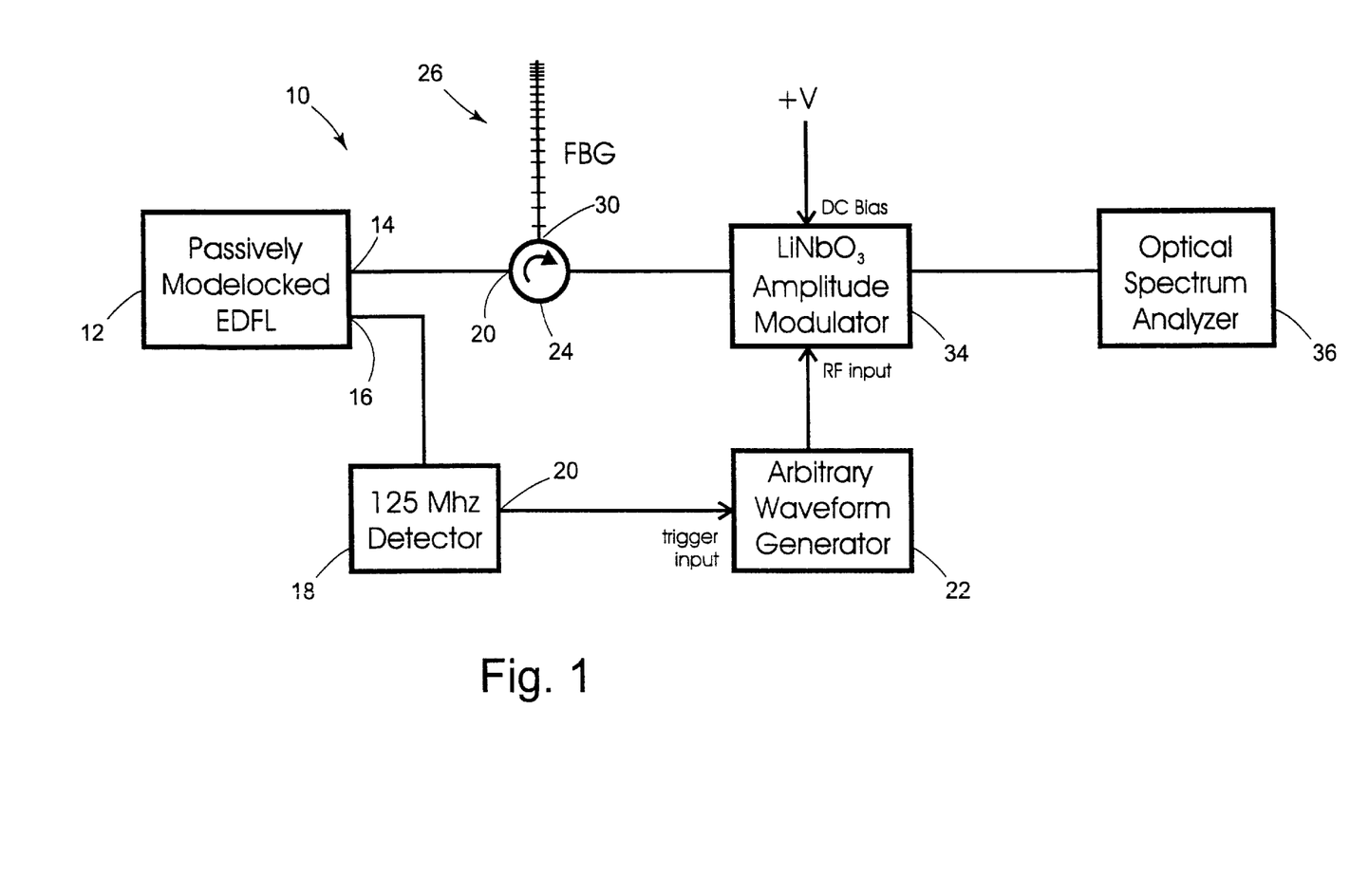
FIG. 1 is a block diagram of a pulse spectral stretcher and shaper in accordance with the present invention.

FIG. 1 illustrates an optical pulse spectral stretcher and shaper (OPSSS) 10 in accordance with the present invention. The OPSSS 10 is coupled to receive a pulse from a source 12, a passively modelocked stretched pulse erbium-doped fiber laser (EDFL) with a rejection output port 14 and a variable output port 16. The variable output port 16 is coupled to a 125 MHz detector 18 having a trigger output 20 that triggers a digitally programmable arbitrary waveform generator (AWG) 22.

The OPSSS 10 includes a non-reciprocal device 24 and a chirped long-length fiber Bragg grating (FBG) 26 having an index of refraction pattern of varying periodicity. The periodicity may be increasing or decreasing, depending on the desired direction of stretch of the optical pulse. In the embodiment illustrated in FIG. 1, the non-reciprocal device 24 comprises a circulator having an input port 28, a recirculating port 30, and an output port 32. The rejection output port 14 is coupled to the input port 28 and the long-length Bragg grating 26 is coupled to the recirculating port 30.

The term long-length refers to an FBG that provide sufficient delay between the shortest and longest wavelengths in the reflection band window to exhibit a sufficient wavelength resolution. The temporal resolution $\tau_0$ (1/bandwidth) of the electronic waveforn generator 22 limits the available wavelength filter resolution $\Delta\lambda_{res}$ of the OPSSS via the equation:

$$\Delta\lambda_{res} = \tau_0/D \qquad (1)$$

where D is the dispersion of the fiber grating. The resolution depends on physical parameters such as grating length L, optical bandwidth W, and the temporal resolution $\tau_0$ of available electronics. These are related by an equation similar to (1):

$$\Delta\lambda_{res} = \tau_0\, W/\tau; \qquad (2)$$

where $\tau$ is the total delay induced by the grating, that is, the differential delay between the maximum and minimum wavelengths reflected by the FBG. $\tau$ is related to the FBG length L by:

$$\tau = (2nL/c) \sim 3L/c \text{ (for } n=1.466); \qquad (3)$$

where c is the speed of light in vacuum ($\sim 3 \times 10^8$ m/s) and n is the effective refractive index of the mode of the FBG (approximately 1.466 for silica glass). The factor of 2 arises because the FBG is a reflective device and delayed wavelengths traverse a given length of the FBG twice.

The value of $\tau_0$ and $\Delta\lambda_{res}$ may vary for different applications. However, no matter what the situation, a standard chirped FBG (<15 centimeters) is too short. Consider a WDM system where the desired $\Delta\lambda_{res}$ would be a typical channel spacing of ~0.4 nm. W is the ~40 nm gain bandwidth of an erbium doped fiber amplifier (EDFA), and the highest speed commercial arbitrary waveform generator has a temporal resolution $\tau_0$ of ~1 nanosecond. Equation 2 indicates that the required length of the FBG would be ~10 meters. Even a moderate system, such as one seeking a final pulse width of ~25 ns, requires a length of ~2.4 meters. In comparison, a standard 5-cm FBG provides a differential delay $\tau$ of merely 0.5 nanoseconds. To attain a $\Delta\lambda_{res}$ of 0.4 nm would require $\tau_0$ to be 5 picoseconds, corresponding to a bandwidth of 200 GHz. Such a waveform generator currently does not exist.

Figure 2:
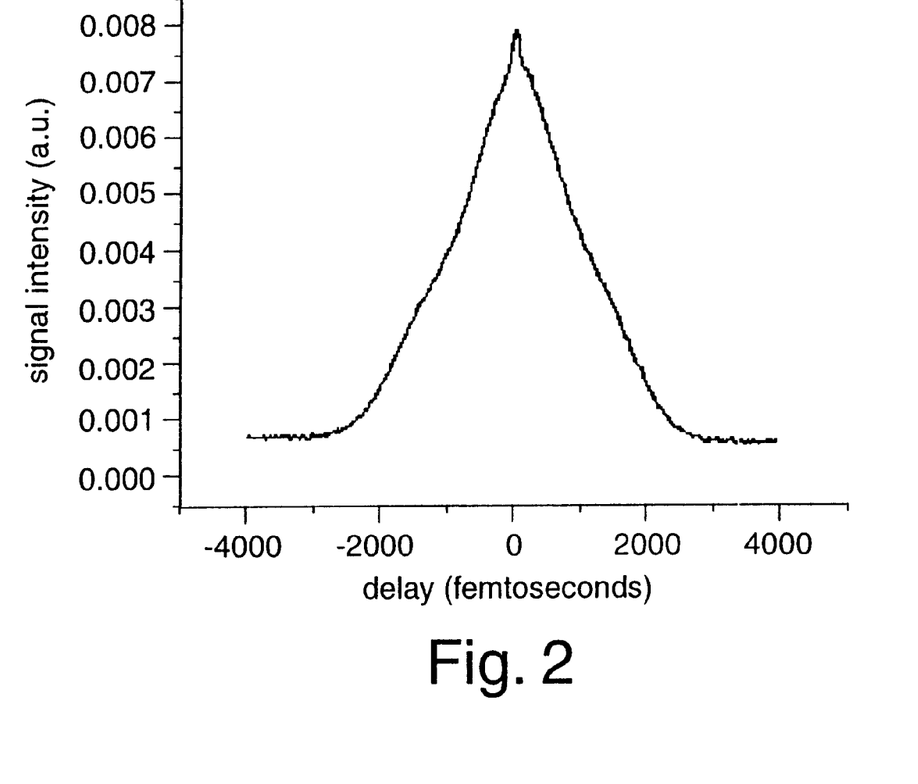
FIG. 2 is a graph of an autocorrelation trace of an original pulse received in an example of the method of the present invention.

In an example of the method of the present invention, the EDFL 12 was set to emit a broad spectrum (approximately 70 nm wide) Gaussian pulse, which was received by the circulator 24 and transmitted to a 3.86 meter long chirped FBG 26. FIG. 2 is an autocorrelation trace of the original pulse incident on the FBG. The pulse is less than 1.5 picoseconds, too short to be measured directly with a photodetector. Only an indirect autocorrelation measurement is possible.

Figure 3:
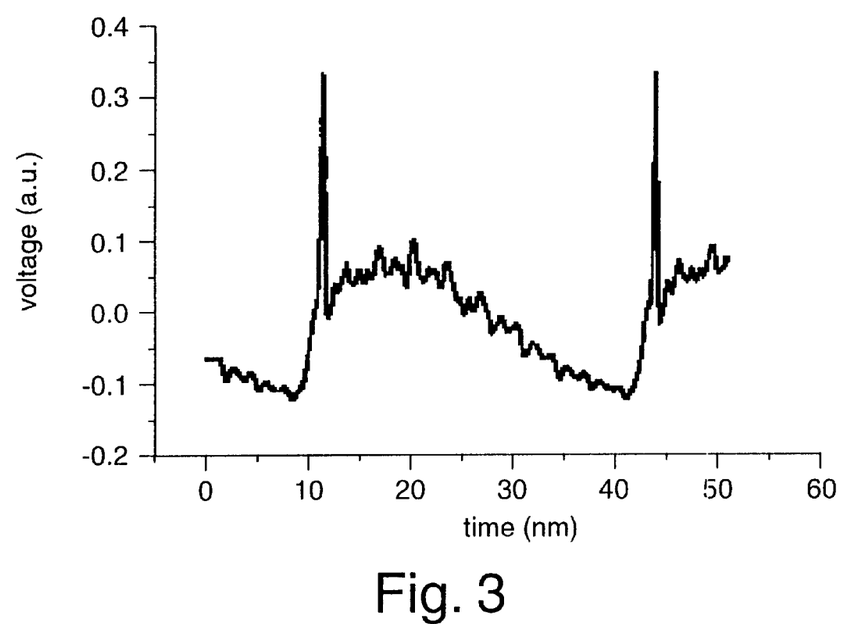
FIG. 3 is a graph of the scope trace of the stretched original pulse produced in an example of the method of the present invention.

The scope trace in FIG. 3 shows the resulting stretched pulse measuring approximately 30 nanoseconds, after passage through the OPSSS 10. For a stretched pulse the frequency spectrum and the pulse envelope are similar, with the use of appropriate scaling factors. The wavelength and temporal resolutions are linked. The spike shown at the front of the pulse is a small reflection between the FBG 26 and the circulator 24. The FBG 26 reflects all wavelengths within a 28 nm window centered at 1550 nm (see FIG. 3). The FBG 26 also provides a dispersion of –1360.8 ps/nm and thus a relative delay of ~38 ns between the shortest and longest wavelengths reflected by the FBG. The stretched pulse is routed by the circulator 24 to a lithium niobate amplitude modulator 34 driven by a 1 GHz internal clock AWG. The optical spectrum is then viewed on an optical spectrum analyzer 36.

For a stretched pulse, because the different frequency (wavelength) components are dispersed temporally, the spectrum and envelope look the same. More importantly, since the frequency and time domain signals are related, selected frequencies can be attenuated by high speed amplitude modulation in the time domain. By applying the appropriate electronic waveform to the optical modulator, one can implement the equivalent of any desired optical filter. In the above applications, the pulse was dispersed almost linearly in time, but, as one skilled in the art will readily realize, a linear dispersion is not necessary to perform spectral shaping.

Time domain spectral shaping may be used to perform many functions, such as the removal of pulse wings, the generation of pulses with Gaussian-shaped spectra, and the flattening of pulse spectra.

The removal of nonlinear chirp also may be possible via arbitrary phase modulation of frequency components. TDSS may be comprised entirely of fiber-based components that are low-loss and robust, whereas the spatial domain spectral shaping methods are bulky and require careful alignment of light beams that are not confined by optical waveguides.

Figure 4:
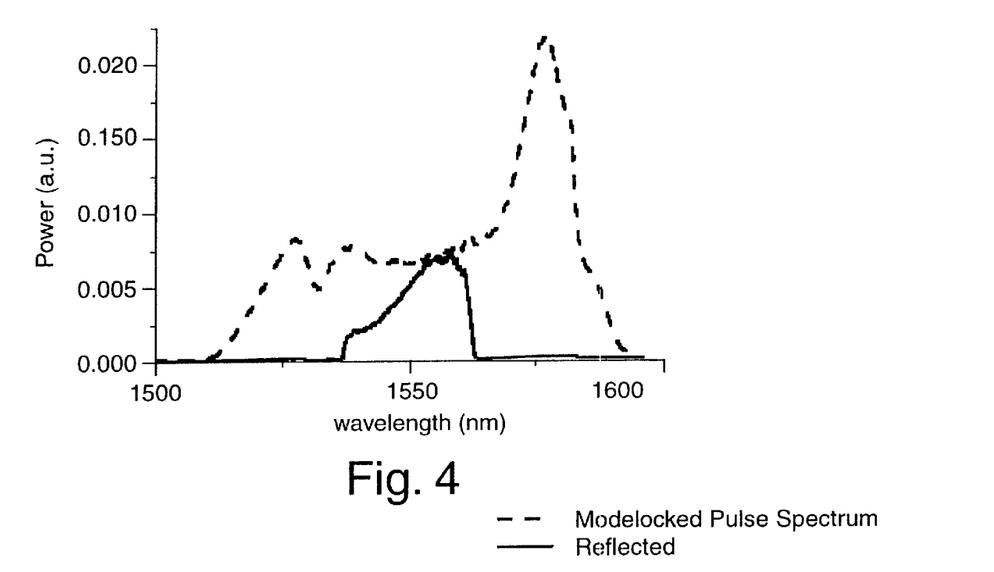
FIG. 4 is graph of the FBG input and reflected output spectra in an example of the method of the present invention.
Figure 5:
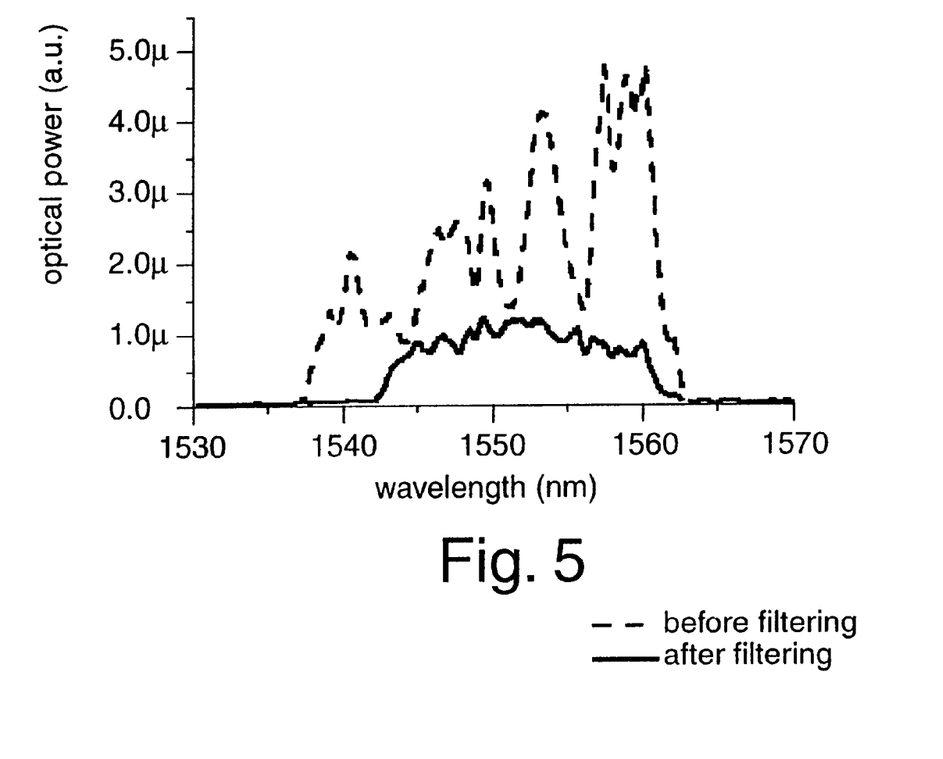
FIG. 5 is a graph of an arbitrary reshaping of an irregular spectrum in accordance with the method of the present invention.

In this example, it was chosen to generate a Gaussian shaped spectrum. Broad Gaussian spectra are desired for OCT and IFOGs, because the coherence function of a Gaussian is short and contains no sidebands. For OCT, sidebands limit image resolution, and in IFOGs they contribute to rotation sensing errors due to coherent Rayleigh backscattering. The amplitude modulator 34 was controlled by a programmed AWG. FIG. 4 shows the spectrum with and without the AWG program activated. The untreated spectrum contains deep ripples due to birefringence in the grating and the polarizing waveguide in the amplitude modulator. In alternative embodiments of the present invention, the FBG 26 may comprise a grating made from polarization maintaining fiber. However, even with the spectral distortions of the present example, a modulation signal was programmed to suppress the ripples, resulting in a much smoother spectrum. An average power reduction of 4.0 dB was observed when the filter program was activated.

Figure 6:
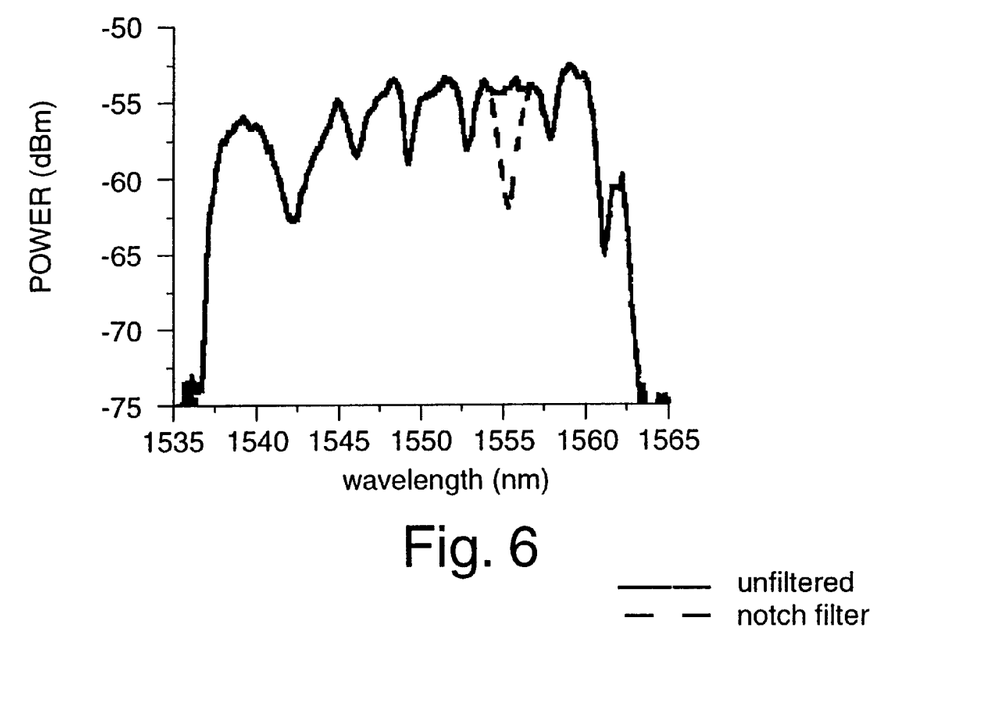
FIG. 6 is a graph of an optical spectra with or without a notch filter pulse shaping in accordance with the present invention.
Figure 7:
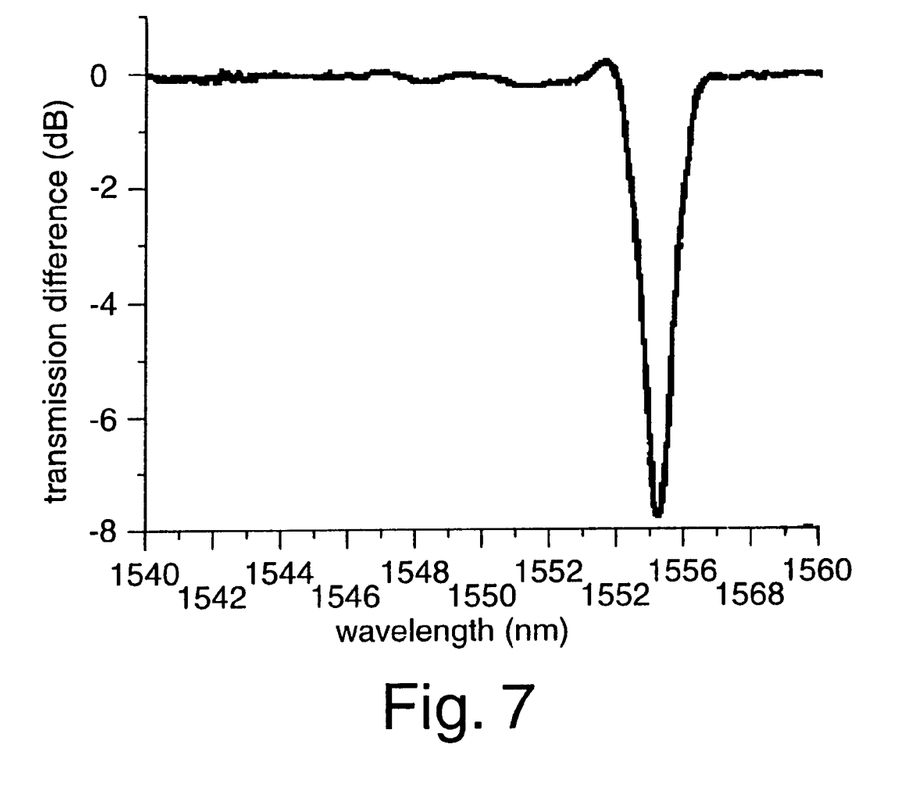
FIG. 7 is a graph of the calculated notch filter shape in accordance with the present invention.

As detailed in equations (2) and (3), the filter resolution $\Delta\lambda$ of the technique is dependent upon the temporal resolution of the AWG, the bandwidth and the length of the grating. The repetition rate of the pulse source also places a limit on the maximum possible stretching. Virtually any desired filter shape may be implemented using the method and apparatus of the present invention. FIGS. 6 and 7 illustrate the effect of a notch filter, a different kind of filter, that may be implemented using the present invention.

Figure 8:
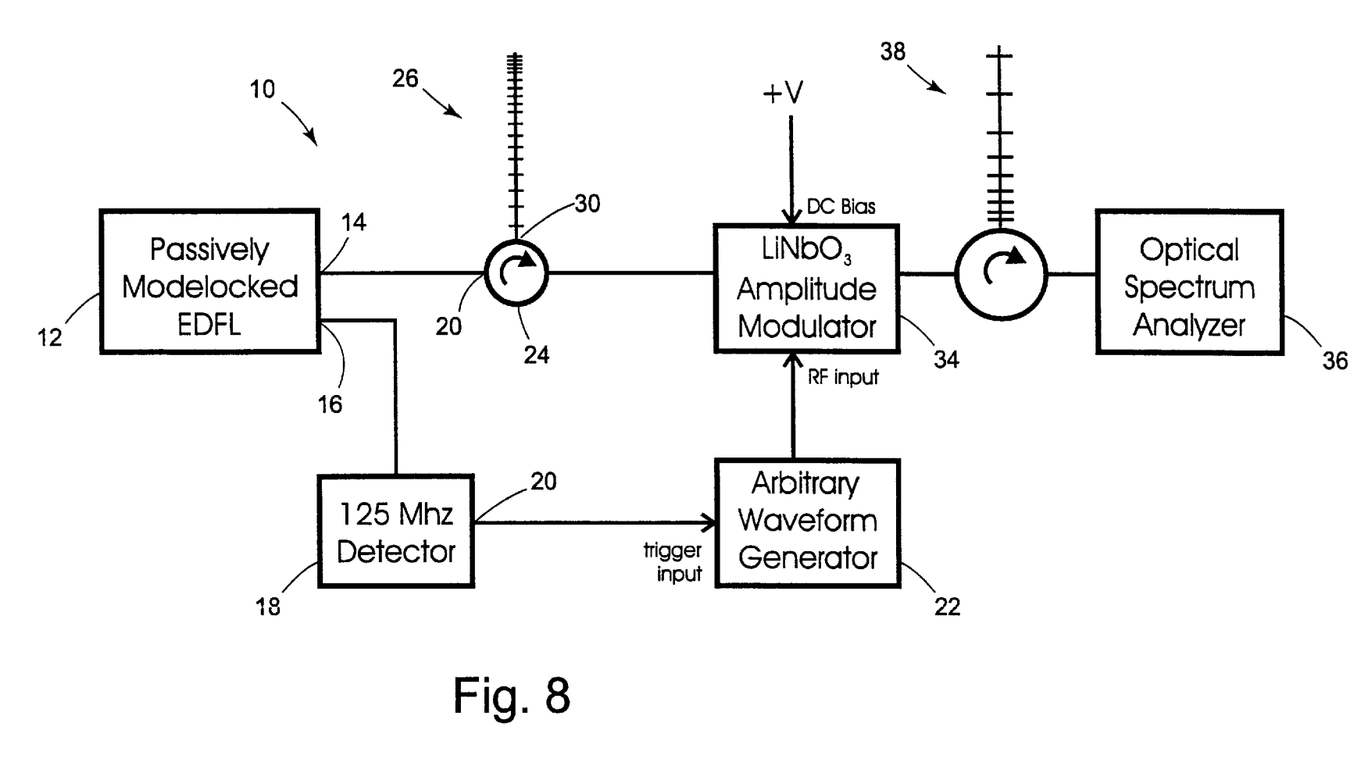
FIG. 8 is a block diagram of a pulse spectral stretcher, shaper and recompressor in accordance with the present invention.

As shown in FIG. 8, the shaped and stretched signal may be recompressed using a second using a second fiber element having a Bragg grating 38 of opposite sign as that of the first grating. Alternatively, since the Bragg grating 26 similarly reflects signals entering from the opposite direction, the shaped and stretched signal may be launched into an opposite end of the grating 26.

The spectral shaping technique of the present invention may be applied in a variety of applications, such as that accomplished with femtosecond pulse shaping with a spatial light modulator (SLM), where arbitrary modulation is done in the spatial domain. Time domain spectral shaping (TDSS) also would be effective in cleaning up pulse wings. In addition, the removal of nonlinear chirp is possible via arbitrary phase modulation of frequency components. An advantage of TDSS is that all components are fiber compatible and robust, whereas the SLM requires careful beam alignment and is bulky.

The use of the long-length FBG also enables pulse compression techniques that would be more difficult if SMF and dispersion compensating fiber (DCF) were used for stretching and recompression. In general, SMF and DCF high order dispersion do not compensate each other. But a single FBG used for both functions is naturally matched to itself.

In conclusion, the present invention demonstrates a technique for implementing arbitrary shape optical filters, which are programmable and may be tailored to produce any desired spectrum given a broad input spectrum. The use of a long-length FBG instead of 20 or 25 km length of SMF makes the present technique more likely to be accepted outside the laboratory and in commercial applications.

Those skilled in the art will appreciate that the present invention may be used in any application that requires pulse stretching and shaping. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A method for stretching an optical pulse and shaping its spectrum, the method comprising the steps of:
   a. providing a an optical fiber element having a first long length fiber Bragg grating having a refractive index perturbation of varying periodicity;
   b. launching the optical pulse into the fiber Bragg grating, wherein the Bragg grating reflects the pulse in a chromatically dispersed output;
   c. coupling the reflected chromatically dispersed output from the grating into an optical modulator; and
   d. temporally modifying the amplitude of the chromatically dispersed output to attenuate selected optical frequencies.

2. The method of claim 1, where the step of providing a grating includes providing a grating having a chromatic dispersion capability between ±10 ps/nm and 10 ns/nm.

3. The method of claim 1, where the optical pulse has less than 90% of its energy in a 10 MHz spectral range.

4. The method of claim 1, where the step of temporally modifying the amplitude of the chromatically dispersed output includes using an arbitrary waveform generator having at least 10 MHz bandwidth.

5. The method of claim 1, further comprising the step of recompressing the chromatically dispersed output after the step of temporally modifying the chromatically dispersed output.

6. The method of claim 5, where the step of recompressing the chromatically dispersed output includes launching the chromatically dispersed output into a fiber element having a second grating of opposite sign dispersion to that of the first grating.

7. The method of claim 5, where the step of recompressing the chromatically dispersed output includes launching the chromatically dispersed output into an opposite end of the optical fiber element.

8. The method of claim 7, further comprising the step of launching the chromatically dispersed output into an optical system that relies on nonlinear optical processes.

9. A pulse stretching and shaping apparatus for stretching and arbitrarily shaping the spectrum of an optical pulse with a desired wavelength resolution $\Delta\lambda_{res}$:
   a. a routing optical device that routs energy between different waveguides, the routing device having an input port, the input port receiving the optical pulse;
   b. an optical fiber element having a long-length fiber Bragg grating optically coupled to the routing optical device, the Bragg grating having an increasing or decreasing periodicity, wherein $$\Delta\lambda_{res} = (\tau_0 \, W \, C)/2nL,$$

where n is the effective refractive index of the propagating mode in the optical fiber element, c is the speed of light, L is the length of the Bragg grating, W is the reflective bandwidth of the grating and $\tau_0$ is the temporal resolution of an optical modulator system; wherein the optical fiber element reflects a chromatically dispersed output.

10. The apparatus of claim 9, further comprising an arbitrary waveform generator that temporally modifies the amplitude of the chromatically dispersed output to attenuate selected optical frequencies.

11. The apparatus of claim 9, the Bragg grating having a chromatic dispersion capability between ±10 ps/nm and 10 ns/nm.

12. The apparatus of claim 9, where the Bragg grating is greater than 20 cm in length.

13. The apparatus of claim 9, where the grating is greater than 2 meters in length.

14. The apparatus of claim 9, where the grating is greater than 3.5 meters in length.

15. The apparatus of claim 9, where the routing optical device is a non-reciprocal optical device.

16. The apparatus of claim 15, where non-reciprocal optical device is an optical circulator.

17. The apparatus of claim 9, where the routing optical device is a device which couples energy from one waveguide to another.

18. An optical coherence tomography system including the apparatus of claim 9.

19. An interferometric optical fiber gyroscope including the apparatus of claim 9.

20. An optical fiber communication system including the apparatus of claim 9.

* * * * *